FIG. 3.

Dec. 16, 1952   G. W. STOCKTON   2,622,132
APPARATUS FOR USE IN DETERMINING THE CHARACTERISTICS
OF COATED METAL SHEETS
Filed July 13, 1948   8 Sheets-Sheet 7

Inventor
George W. Stockton
By
William Davis
Attorney

Dec. 16, 1952 G. W. STOCKTON 2,622,132
APPARATUS FOR USE IN DETERMINING THE CHARACTERISTICS
OF COATED METAL SHEETS
Filed July 13, 1948 8 Sheets-Sheet 8

FIG. 15.

Inventor
George W. Stockton
By
William Davis
Attorney

Patented Dec. 16, 1952

2,622,132

UNITED STATES PATENT OFFICE 2,622,132

APPARATUS FOR USE IN DETERMINING THE CHARACTERISTICS OF COATED METAL SHEETS

George William Stockton, Birmingham, England

Application July 13, 1948, Serial No. 38,476
In Great Britain July 19, 1947

9 Claims. (Cl. 175—183)

This invention relates to apparatus for use in determining physical and/or electrical charcteristics of coated metal sheets and is particularly applicable to ferrous laminations used in electrical machines and appliances, though it may be used in other applications for which it is suitable.

The object of the invention is the provision of a method of and means for enabling data hitherto unavailable relating to the inculation to be ascertained so that it can be recorded, collated, and applied in the design, construction, manufacture and testing of insulated ferrous sheets; a further object is to enable comparisons between specimens having similar, identical, or different coatings to be made on a scientific basis; a further object is to provide data to enable specific constants to be ascertained by applications of mathematical law.

Reference may be had to the accompanying drawings in which.

In one form of apparatus according to the invention, two platens 1, 2 relatively movable are arranged to hold the specimen, to apply compressive pressure thereto, and to act as electrodes for the application of a voltage thereto. It is convenient to arrange the platen-electrodes so that one is above the other, and to move the lower one in relation to the upper, any suitable mechanism e. g. mechanical, electrical, fluid pressure, being employed to apply the compressive pressure.

For convenience, it is proposed to use a hydraulic ram 3, coupling plunger 4, lever-operated pump 5, an air cushion and pressure gauge (not shown) to indicate the hydraulic pressure in lbs. per unit of area in the system; by simple division, pressure per unit of area on the platens and specimen can readily be ascertained. A manually-operable release valve indicated at 6 may be employed to bring an elevated pressure down to zero in one step or lowered in successive stages to provide loadings on a descending scale. Interposed between each electrode support and its electrode is a sheet or block of insulating material 9 of low compressibility or virtually incompressible, of high electrical resistance, and low thermal conductivity where provision is made for heating the electrodes above room temperature.

Means are incorporated for measuring the thickness of the specimen and visibly indicating measurements. To ensure accuracy at every height to which the lower platen may be lifted, the plunger 4 is guided by precision means, one form of which includes longitudinal V grooves 11 Figure 5 cut in the periphery of the plunger (three or more in number), and static guides 12 also of V section for engagement therewith, the angle included by the grooves being slightly in excess of that included by the guides so that apices only of the guides are in contact with the groove bottoms. The platen supports are preferably of massive and tapering configuration to provide freedom from appreciable deflection under the highest working pressure; the lower support has a platform 13 for supporting screwed stop members 10 adjustable up or down by rotation and lockable by nut. Any suitable measuring instruments may be attached to the upper platen for co-operation with the stops 10 preferably having the form of a pair of clockface gauges 14 including a circular graduated dial and a rotary finger measuring in say ten-thousandths of an inch.

Figure 1:
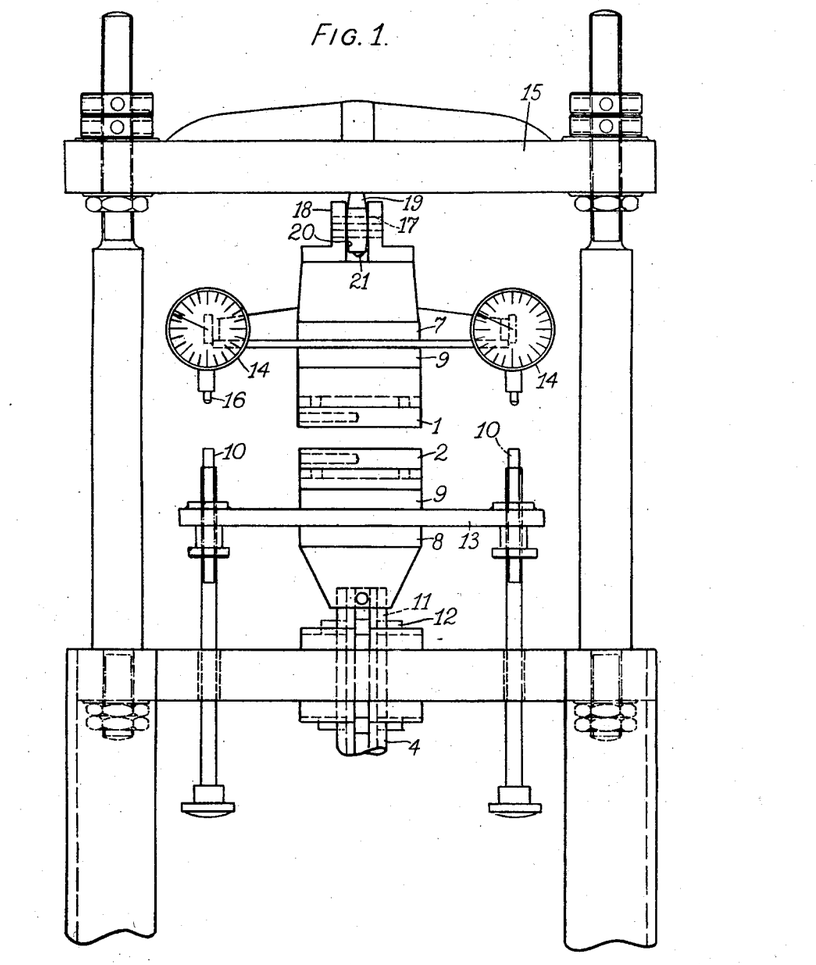
Figure 1 is a front elevation and Figure 2 an end elevation of the upper part of apparatus according to the invention.

To ensure accurate successive readings, it is important that the plunger ends of the gauges and the stop faces should re-register in exactly the same place after separation so that readings are not affected by a variable which might be introduced by different contact surfaces. Any suitable means may be employed for this purpose one example of which depicted in Figures 1 and 2 will now be described.

Figure 2:
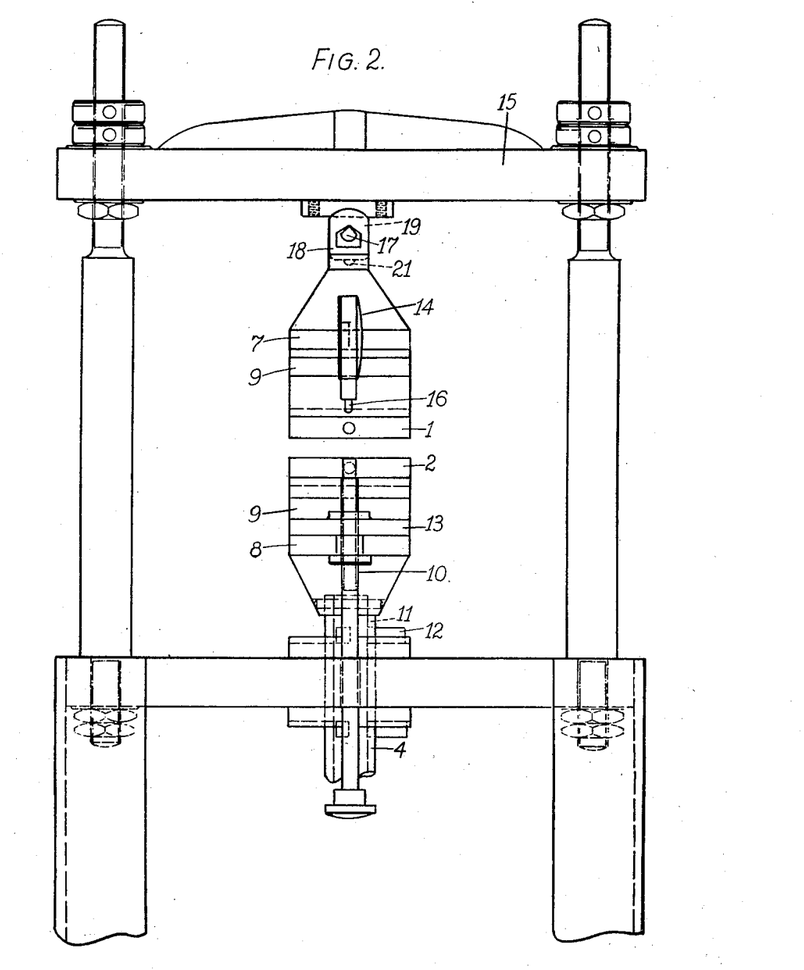
Figure 3:
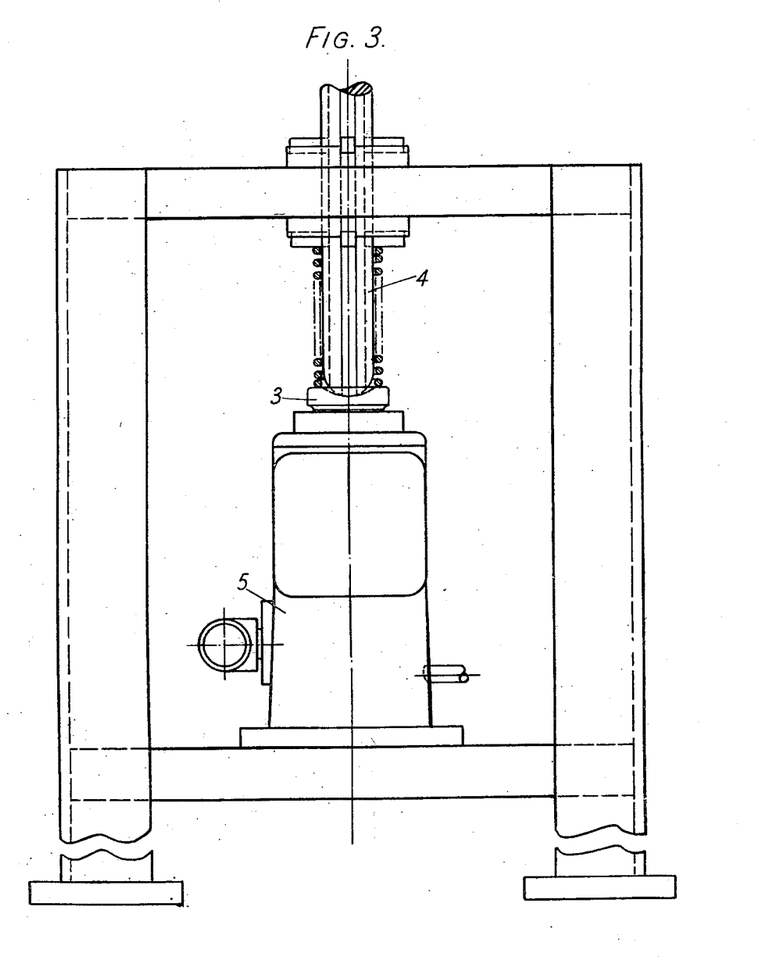
Figures 3 and 4 are similar views to Figures 1 and 2, but of the lower part of such apparatus.
Figure 4:
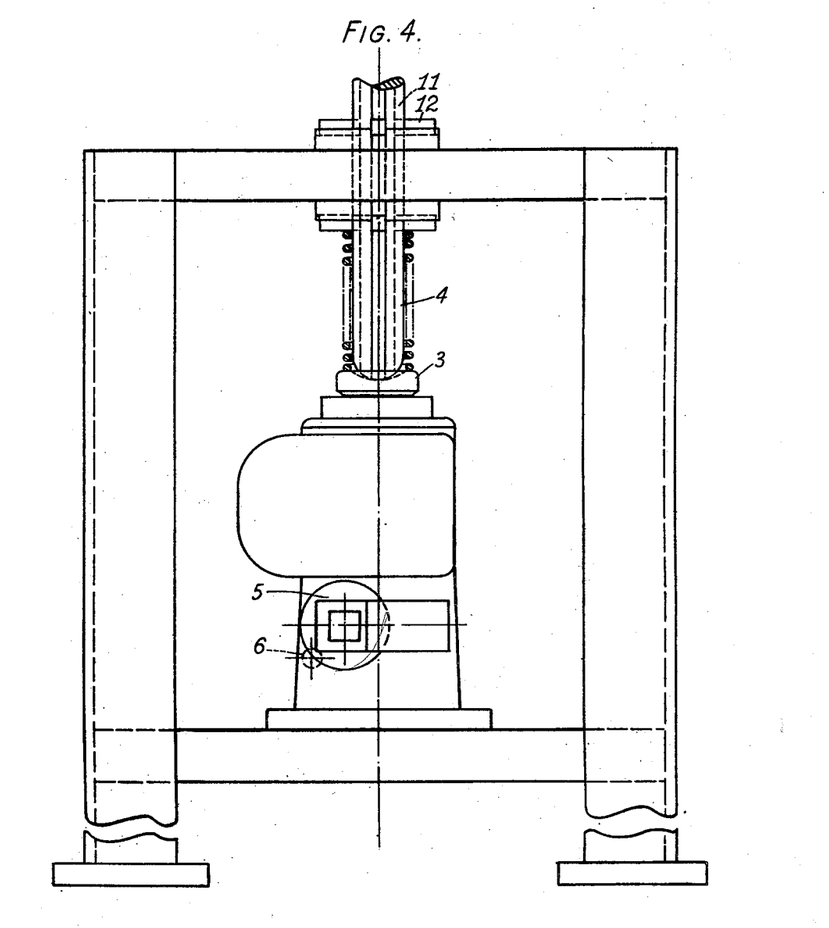

The upper platen-electrode carrying the gauges is suspended when free on a horizontal knife edge 17 which lies in a vertical plane common to the gauge plungers, as seen in Figure 2, and upon the upper end of the platen are provided two spaced upstanding lugs 18 arranged to embrace a lug 19 depending from the frame 15 of the apparatus, said lug 19 having a curved or circular portion 20 on each side face to guide the platen in its up or down movement and at the same time provide a degree of freedom about a horizontal axis. When the ram moves upward, the upper platen, the knife edge and the specimen between the platens are lifted until a certain amount of lost movement is taken up, whereupon the upper part of the platen support between the lugs makes contact with and is stopped by a ball 21 on the underside of the static lug 19 which forms an abutment with universal motion to resist the ram pressure. When the pressure is released and the ram lowered, the upper electrode descends a short distance and is re-seated by the knife edge in exactly the same place on the lower platen; similarly the gauge plungers and the stops return always to the same place relative to one another.

In one method of using apparatus according to the invention, the thickness of a specimen may be measured by first closing the platens and adjusting the gauges to zero, opening the platens, inserting the specimen, closing the platens by light hydraulic pressure just sufficient to hold the specimen tightly, and reading the gauges (which will probably have different readings) and taking the mean of the two. From the calculated total thickness of the pieces and the mean total thickness of the pieces the space factor can then be readily found. Subsequent readings can then be taken in a similar manner in steps under increment pressures of say 25 lbs. per sq. inch, the mean thickness and space factor of the uncoated metal sheet being thereby obtained; the space factor percentage will usually be found to increase with increasing pressure, which may rise to a loading of say 350 lbs. per sq. inch.

After the sheet or sheets has or have been coated, similar measurements may be made at increment pressures corresponding to those described which will yield the space factor of the coated sheet and the thickness of the insulation, film, layer, or coating, collectively or individually, for one side, or by simple division the thickness of each coating or the like on each side.

A further set of readings may be taken on a descending pressure scale by reducing the hydraulic pressure in a series of decrement steps to pressure levels corresponding to those of the increment pressure steps. The plotted curves of the two sets of figures indicate that generally the space factor percentages of the insulating coating are higher on the descending scale than on the ascending scale, while the thicknesses are lower on the descending scale than on the ascending scale.

Suitable electrical end instruments are associated with the apparatus, such as resistances, potentiometers, meters, and other equipment, and wired to enable any desired D. C. or A. C. voltage say between nought and one hundred to be applied to the specimen by way of the platen-electrodes, and to indicate the applied voltage, the current passing, and the resistance and/or inductance on that part of the circuit bounded by the electrodes. With the compressive pressure and thickness indications referred to may be indicated, recorded or calculated the applied voltage, the voltage drop across the specimen, the voltage gradient per unit thickness of the specimen, the resistance, and the current flowing through the specimen.

From the figures obtained may be calculated the specific resistance of the insulation in terms of a common unit say ohms per cubic inch and/or power factor which provide a very valuable and hitherto unobtainable measure of the insulating properties of the coating or the like at selected compressive pressures.

Tests so far carried out indicate definite relationships between specific voltage gradients and specific resistivity.

The electrode surfaces in contact with the specimen may be both plane or one preferably the bottom one may be plane and the other grooved to form a number of small contact areas; in another modification, the upper electrode may be provided with a number of plungers spring-loaded to accommodate the contour or surface irregularities of the specimen; the contact area of the electrodes are made appropriate to the needs of the particular test, and the configuration of the electrodes may be such as to conform to that of a specimen which is other than a simple square or rectangle i. e. including an aperture.

Figure 7:
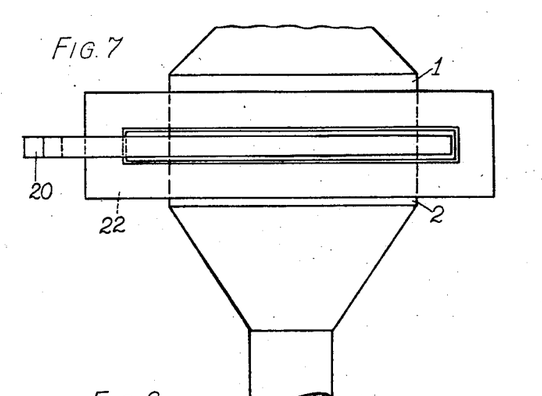
Figures 7 and 8 are elevation and plan of means for setting up a magnetic field in the specimen.

Provision may be made for subjecting the specimen to the influence of an alternating magnetic field while the tests are being conducted. One device illustrated in Figures 7 and 8 includes a U-shaped member 20 having two limbs relatively adjustable each of which carries a pole piece 20a surrounded by a winding 22, the pole pieces being adjusted to grip the adjacent edges of a specimen 21a but being electrically insulated therefrom by means of insulating wafers 23 which are such that they do not substantially affect the application of the magnetic field to the specimen. Slots in the overlapping ends of the two limbs and holding bolts 20b provide for the adjustment aforesaid.

Figure 8:
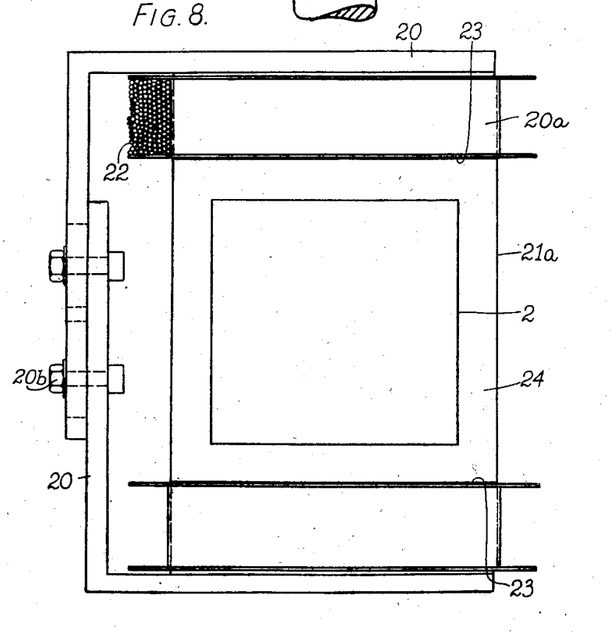

To avoid edge effects, the surface area of the specimen 21, shown for convenience in Figure 8, may be larger than that of the electrodes so that the area subjected to test is surrounded by a free area 24.

A general object is to simulate working conditions and in pursuance further thereof, means may be incorporated for submerging the specimen in oil during test. One such means depicted in Figure 9 consists of an open-topped tray 25 integral with or attached to the lower electrode.

Figures 9, 10:
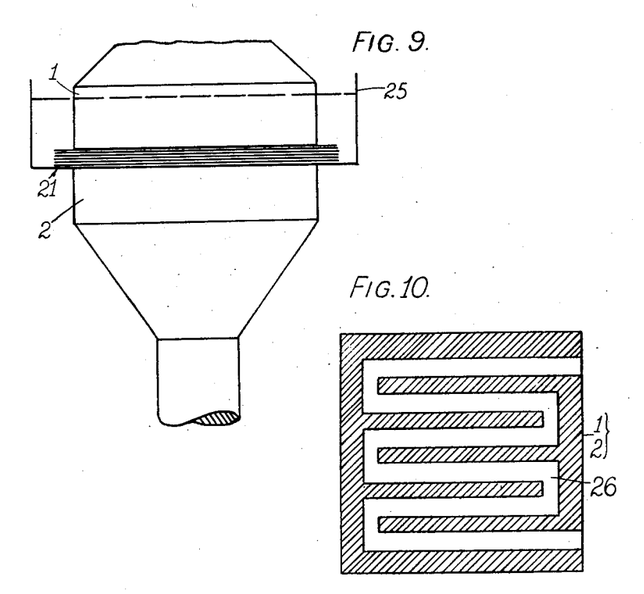
Figure 9 depicts in elevation a platen provided with an oil tray for submerging the specimen.
Figure 10 is a view in cross-section of a cavitated electrode for accommodating an electric heating element.

Since under some working conditions, laminations become heated, it may be desirable to conduct tests under elevated temperatures. Accordingly, provision may be made for raising the temperature of the specimen above room temperature; this may be done in any convenient manner. Figure 10 illustrates in cross-section a platen-electrode cavitated at 26 to accommodate an electric heating element preferably thermostatically controlled and associated with a suitable kind of thermometer e. g. a thermocouple.

Figures 11, 12, 13:
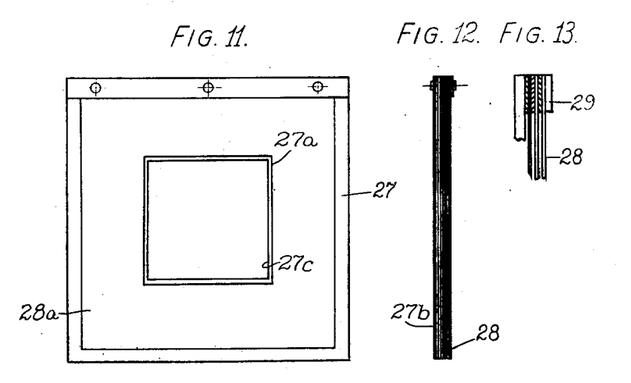
Figures 11, 12 and 13 are plan end elevation and fragmentary section of a device for locating the sheets of a pack.

When dealing with a pack of plates, it is desirable in the interest of accuracy and consistency to ensure a re-assembly of the plates which conforms exactly to the first or preceding assembly or assemblies as for example after coating. With such object in view, I propose to use a locating device one form of which is illustrated in Figures 11, 12 and 13 wherein a book 27 leaved with sheets 28 is interleaved with spacers 29, each spacer being conveniently made of linen and each sheet having an aperture 27a to leave the middle of the specimen at the top and bottom of the pack free to contact the electrodes. The free areas outside the middle of the specimen are thereby insulated from one another. The linen sheets and spacers are mounted on a rigid base 27b having a central aperture 27c made as a sliding fit over the platen-electrodes. The specimen laminations are located by their edges being brought into alignment with inked lines 28a on the linen sheets for three edges and the fourth by abutment against the spacers 29. The plates of the pack may be marked in one corner further to ensure of correct re-assembly.

Figures 5, 6, 14:
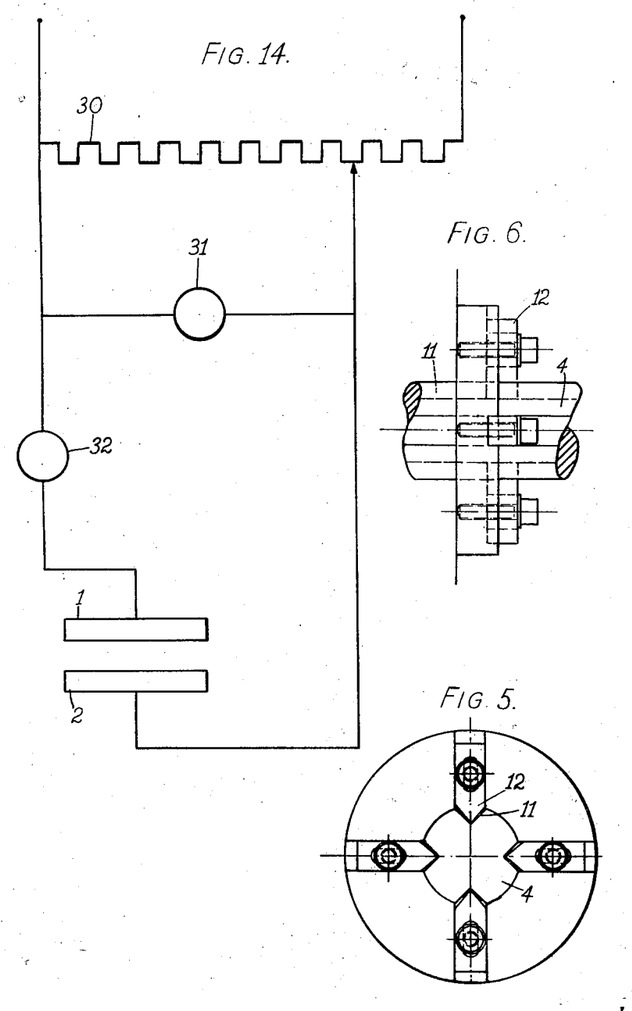
Figures 5 and 6 are fragmentary views showing a guiding means, in plan and elevation, for the lower platen included in Figure 1.
Figures 14 and 15 are circuit diagrams.
Figure 15:
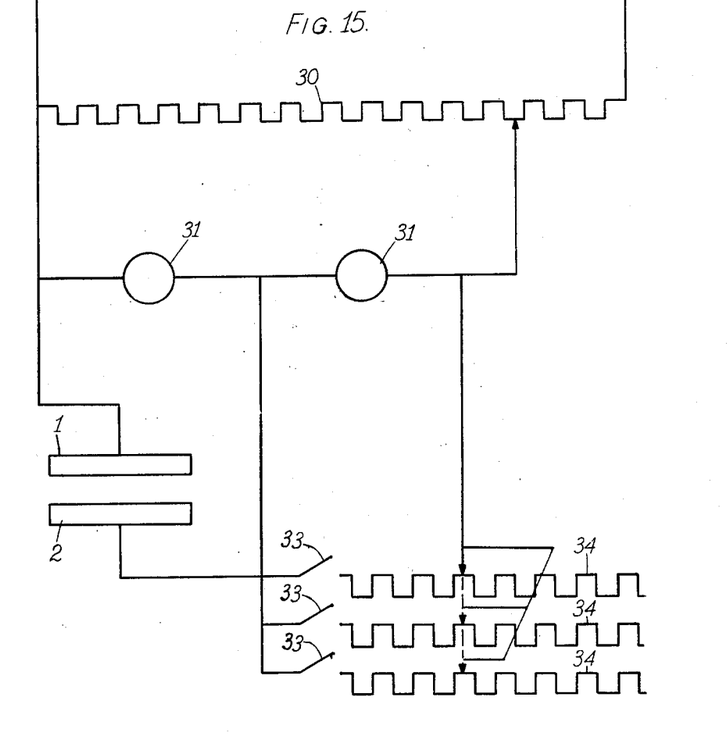

In Figure 14, 30 indicates a potential divider, 31 a voltmeter, 32 an ammeter. By their aid, the electrical constants can be readily ascertained. Figure 15 includes also, switches 33, and potentiometers 34 of different ranges, calibrated to read directly in ohms.

Having thus described my invention, what I claim is:

1. Apparatus for testing insulated steel sheets for electrical uses, comprising a support, a lower platen mounted on said support, means for moving said platen through a vertical path, fixed guides between said support and said platen to guide said platen during its vertical movement, a frame fixed relative to said support and extending above and over said platen, an upper platen suspended from said frame above said lower platen, suspension means between said upper platen and frame for accommodating a limited amount of universal motion of said upper platen when said lower platen is elevated, cavities in said platens, and electric resistance means in said cavities for heating said platens.

2. Apparatus for testing insulated steel sheets for electrical uses, comprising a support, a lower platen mounted on said support, means for moving said platen through a vertical path, fixed guides between said support and said platen to guide said platen during its vertical movement, a frame fixed relative to said support and extending above and over said platen, an upper platen suspended from said frame above said lower platen, suspension means between said upper platen and frame for accommodating a limited amount of universal motion of said upper platen when said lower platen is elevated, a transverse bar carried by said lower platen and extending beyond each side thereof, adjustable stop members on each end of said transverse bar equidistant from said lower platen, a transverse support carried by said upper platen and extending beyond each side thereof in vertical relation to said transverse bar, and gauges on each end of said transverse support equidistant from said upper platen and having operating elements in vertical alignment with said stop members to provide two independent measurements.

3. In combination with apparatus for determining the characteristic of insulated steel plates for electrical uses, a device for locating the units of a pack of plates consisting of a book leaved with sheets of flexible insulating material apertured to provide free spaces in the middle of the plates and interleaved with spacers of insulating material, the laminations of a pack specimen being received between adjacent leaves and being located by their edges.

4. Apparatus for testing insulated steel sheets for electrical uses, comprising a support, a lower platen slidably mounted on said support, means for moving said platen through a vertical path, fixed guides between said support and said platen to guide said platen during its vertical movement, a frame fixed relative to said support and extending above and over said platen, an upper platen suspended from said frame above said lower platen, and suspension means between said upper platen and frame for accommodating a limited amount of lost motion in an upward or downward direction of said upper platen when said lower platen is elevated or lowered, and means for guiding the suspension means during such lost motion, said guiding means including cooperating guide elements on said upper platen and said frame which prevent movement of said suspension means in a plane transverse to the direction of said lost motion.

5. Apparatus according to claim 4 wherein the said frame and the said suspension means are provided with fulcrum abutment means which come into action at the upper limit of the upward movement of the upper platen and allow universal adjusting movement of the upper platen relative to the frame.

6. Apparatus for testing insulated steel sheets for electrical uses, comprising a support, a lower platen mounted on said support, means for moving said platen through a vertical path, fixed guides between said support and said platen to guide said platen during its vertical movement, a frame fixed relative to said support and extending above and over said platen, an upper platen suspended from said frame above said lower platen, and suspension means between said upper platen and frame for accommodating a limited amount of lost motion in an uward or downward direction of said upper platen when said lower platen is elevated or lowered, said suspension means including a horizontal knife edge support carried by said frame, a hanger which carries said upper platen and is apertured to surround freely said support, and guide means between the knife edge support and said hanger which allow a limited amount of articulation of the hanger about the knife edge but prevent motion in the horizontal plane thereof.

7. Apparatus according to claim 6 wherein said guide means includes an element depending from said frame and centrally supporting said knife edge, said element having curved outer surfaces adjacent said pivot and a rounded protrusion on its lower end for abutment with a portion of the said hanger, said hanger including two hanger members spaced to straddle snugly said element for engagement with the curved surfaces thereof.

8. Apparatus according to claim 4 wherein said lower platen includes an electrode provided with an oil tray for submerging the specimen in liquid during test.

9. Apparatus according to claim 4 wherein said platens are provided with means for subjecting a specimen to the action of a magnetic field including two relatively adjustable pole pieces with windings thereon, and means for holding the pole pieces in adjusted position relative to the specimen.

GEORGE WILLIAM STOCKTON.

(References on following page)